United States Patent [19]

David

[11] Patent Number: 5,078,335
[45] Date of Patent: Jan. 7, 1992

[54] DEVICE MAKING IT POSSIBLE TO CONVERT A MOTORCYCLE INTO A MOTORIZED ULTRALIGHT AIRCRAFT

[76] Inventor: Jean-Pierre David, 11 rue de Lancry, 60200 Compiegne, France

[21] Appl. No.: 507,354

[22] Filed: Apr. 9, 1990

[30] Foreign Application Priority Data

Apr. 11, 1989 [FR] France .................. 89 04747

[51] Int. Cl.⁵ .............................................. B64C 37/02
[52] U.S. Cl. ........................................ 244/2; 244/902; 244/903; 244/900
[58] Field of Search .................. 244/2, 900, 901, 902, 244/903

[56] References Cited

U.S. PATENT DOCUMENTS

| | | | |
|---|---|---|---|
| 4,068,810 | 1/1978 | Malewicki | 244/2 |
| 4,269,374 | 5/1981 | Miller | 244/2 |
| 4,568,043 | 2/1986 | Schmittle | 244/900 |
| 4,657,207 | 4/1987 | Poling | 244/2 |
| 4,875,642 | 10/1989 | Flynn | 244/903 |
| 4,934,630 | 6/1990 | Snyder | 244/903 |

FOREIGN PATENT DOCUMENTS

| | | |
|---|---|---|
| 2357628 | 5/1975 | Fed. Rep. of Germany . |
| 3430412 | 2/1986 | Fed. Rep. of Germany ...... 244/903 |
| 380815 | 12/1907 | France . |
| 570924 | 5/1924 | France . |
| 657742 | 5/1929 | France . |
| 683229 | 6/1930 | France . |
| 2585668 | 2/1987 | France .............................. 244/902 |
| 427517 | 6/1967 | Sweden .............................. 244/902 |

Primary Examiner—Joseph F. Peters, Jr.
Assistant Examiner—Anne E. Bidwell
Attorney, Agent, or Firm—Pearne, Gordon, McCoy & Granger

[57] ABSTRACT

The device comprises an arch-like structure (3), shaped similar to a cage, which can be fixed to the motorcycle (1), essentially to its frame and sides; a parafoil sail (5), which can be mounted at the top of the cage, the sail ends being lowerable by a pedal or handle control; a propeller propulsion system (8) mounted at the rear of the motorcycle on the arch-like structure; and a clutching and declutching mechanism which, on control, drives either the driving wheel or the propeller.

5 Claims, 3 Drawing Sheets

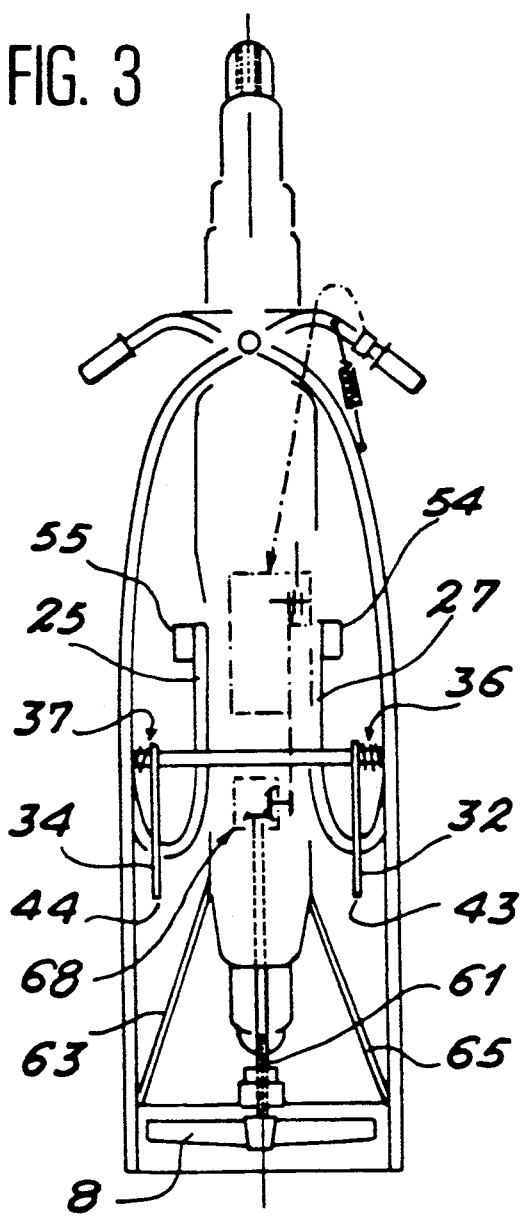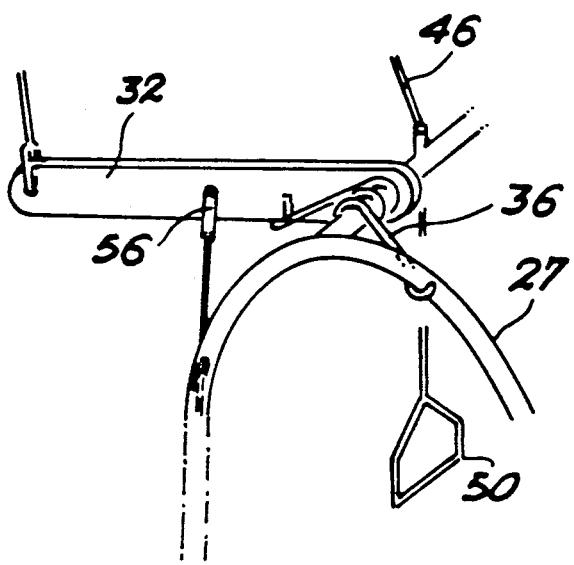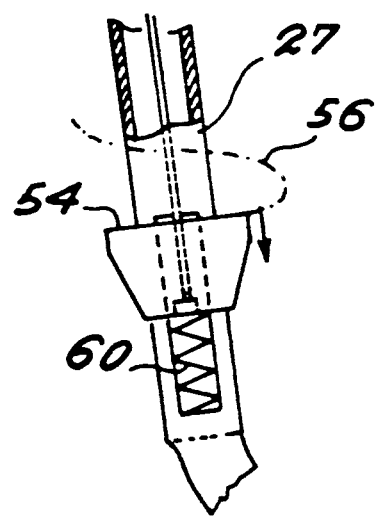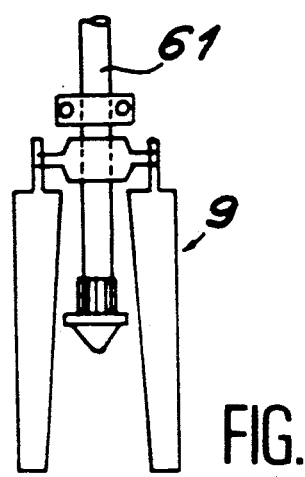

DEVICE MAKING IT POSSIBLE TO CONVERT A MOTORCYCLE INTO A MOTORIZED ULTRALIGHT AIRCRAFT

BACKGROUND OF THE INVENTION

The present invention relates to a device making it possible to transform a motorcycle in to a powered or motorized ultralight aircraft.

FIELD OF THE INVENTION

Among aircraft of a relatively simple type, powered ultralight gliders are known, which are formed by a combination of a tricycle carrying a propeller and a wing of a special type and which is generally rectangular and is used by both flat country and gradient parafoil parachutists and which is usually known as a "parafoil sail".

DESCRIPTION OF THE RELATED ACT

Such a tricycle is sometimes foldable, carries a front wheel and two rear wheels carrying a chassis, on which are mounted at least one passenger seat and the propeller propulsion motor.

These aircraft, which have excellent performance characteristics, are nevertheless subject to constraints limiting their possible uses. In particular, the rolling part of such aircraft is generally rudimentary because it has to meet weight requirements. Therefore it is fragile and has a poor shock resistance, particularly when not landing on a landing strip.

The return of the glider to the hangar often involves disassembly or partial folding up of its different components and the need to call on transportation means. The return to the hangar usually takes place by towing behind a car, or by transportation on a roof-rack. bp U.S. Pat. No. 4,657,207 (D. POLING), describes a kit making it possible to transform a motorcycle into an aircraft. This kit or adaptor has a propeller propulsion system with means for the direct attachment thereof located above the rear wheels. A winged structure is connected by suspending ropes at the front and rear of the motorcycle, steering control cables being connected to bars located below the wings or sails of the parachute.

A first glance at the above patent could give rise to the idea that the device was identical to that of the present invention, but on more detailed consideration this is clearly not the case.

The object of the present invention is to provide a device making it possible to equip motorcycles and thus provide a novel aircraft not suffering from the aforementioned disadvantages.

The device according to the invention comprises an archlike structure similar to a cage and which can be fixed to the motorcycle, mainly to its frame and to its sides; a parafoil sail which can be mounted at the top of the cage, the ends of the sail being lowerable by a handle or pedal control; a propeller propulsion system mounted at the rear to the motorcycle on the arch-like structure; and a clutching and declutching mechanism ensuring, on control, the driving of either the driving wheel or the propeller.

It is clear that a motorcycle equipped in this way is completely autonomous, because it make possible to start and land at random at the point chose by the pilot and without requiring another vehicle for towing or transportation purposes. Therefore, it gives a high degree of freedom never reached up to now by aircraft of the same type.

BRIEF DESCRIPTION OF THE DRAWINGS

The invention is described in greater detail hereinafter, relative to non-limitative embodiments and the attached drawings, wherein show:

FIG. 3 a diagrammatic plan view of the assembly constituted by the motorcycle and the device according to the invention, but excluding the parafoil sail.

FIG. 4 shows in detail a brake control return mechanism.

FIG. 5 an example of a folding propeller.

FIG. 6 the diagram of a pedal and its return spring.

DETAILED DESCRIPTION OF THE PREFERRED EMBODIMENT

Figure 1:
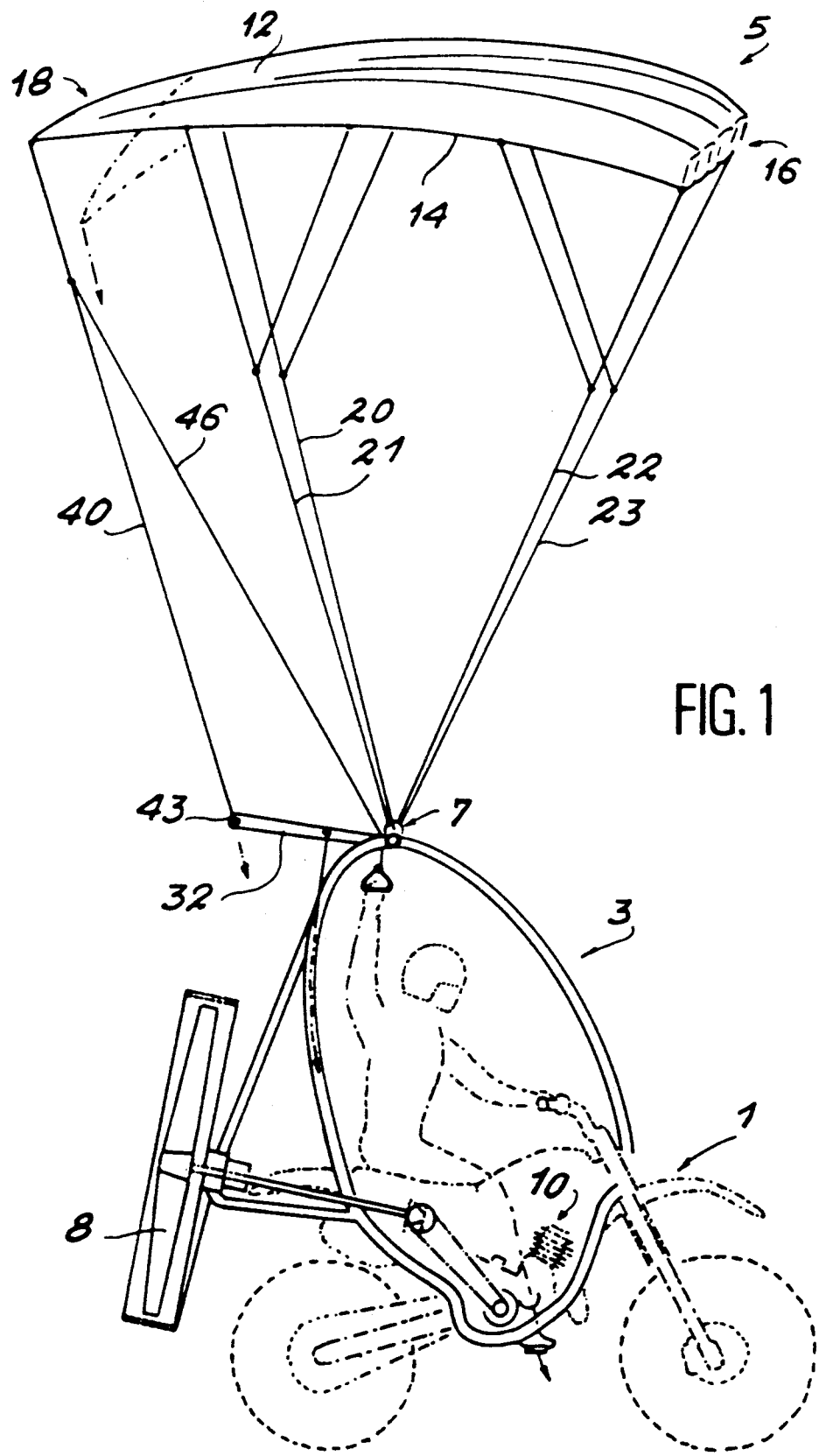
FIG. 1 a diagrammatic, perspective view of a motorcycle equipped with a device according to the invention, as it appears in flight.
Figure 2:
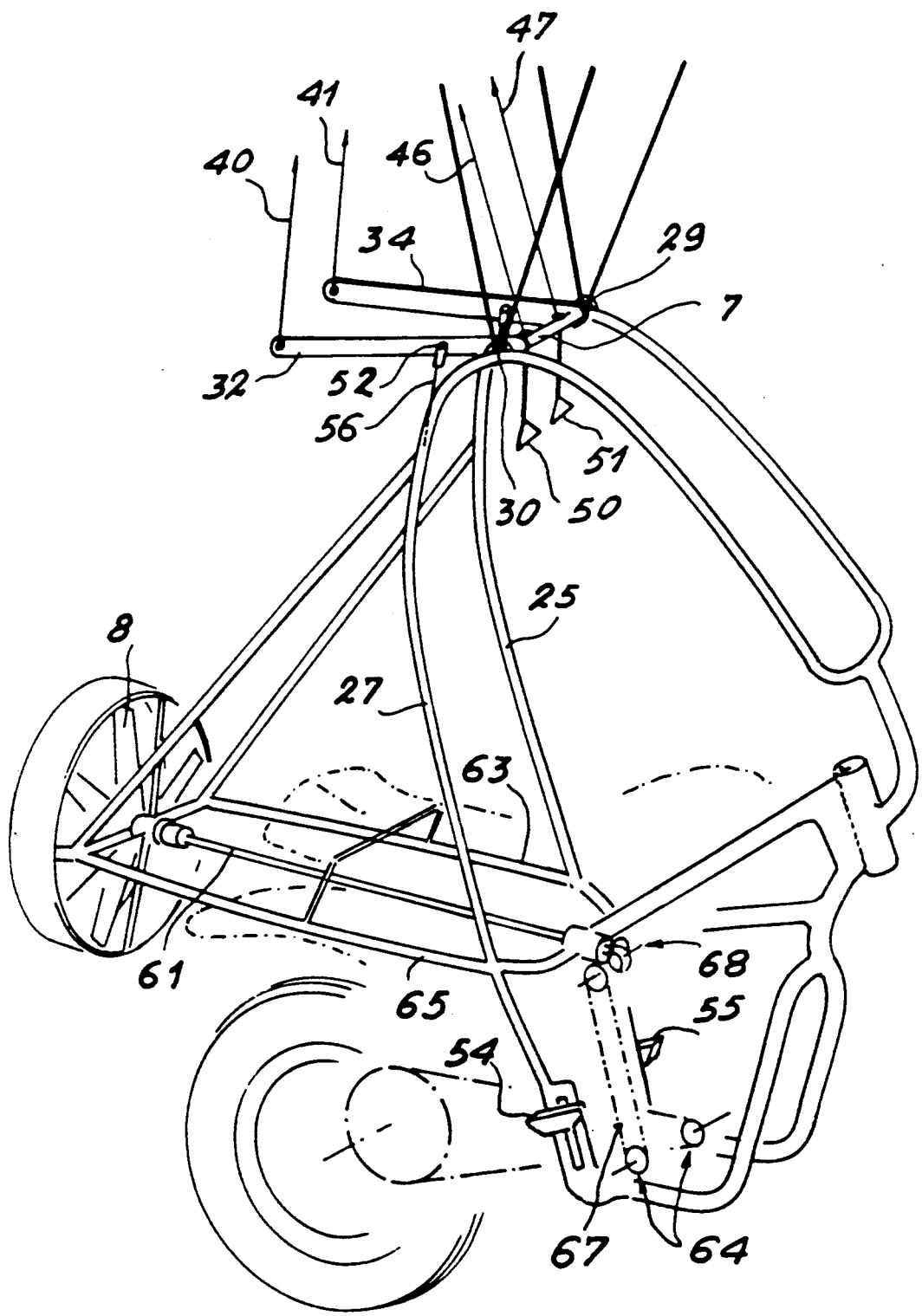
FIG. 2 a perspective view showing the detail of the central part of FIG. 1.

FIG. 1 shows that the motorcycle 1 is equipped with an archlike structure 3 similar to a cage and which surrounds the pilot and is connected to the motorcycle frame.

A parafoil sail 5 is fixed to a crossbeam 7 at the top of the cage, while a propeller 8 is mounted in the rear part of the motorcycle, so that its rotational shaft has ability to be connected or disconnected to the output shaft of the motor or engine 10.

The parafoil sail 5 of the standard type is formed from two parallel sufaces, namely the wing lower surface 12 on the top and the wing upper surface 14 on the bottom, which are connected by vertical membranes defining boxes or containers and their are generally seven, nine or eleven of the latter. In the present case, preference is given to the use of a sail with twelve boxes so as to be easily able to take a load of approximately 200 kg essentially constituted by the weight of the pilot and the assembly formed by the motorcycle and its device.

In the front part it is possible to see the leading edge 16 by which penetrates the air entering the boxes at the time of inflating the sail and in the rear part the trailing edge 18.

From the vertical membranes or ribs emanate four suspending ropes 20,21,22,23, which are not attached to straps, as in the case of unpowered parafoil means. Instead, they are directly connected to the arch-like structure 3 on the crossbeam 7, which interconnects the left-hand post 25 and the right-hand post 27 forming part of the arch-like structure 3.

To the two ends 29,30 of crossbeam 7 are articulated braking levers 32,34, which are kept in the horizontal position by the action of a return spring 36,37 bearing on the corresponding post.

Two supplementary suspending ropes on either side of the sail connect the ends thereof to the free ends 43,44 of the braking levers 32,34. Two cables 46,47 carrying handles 50,51 can be displaced in tubular passages provided in the crossbeam 7. These cables are fixed to the suspending ropes 40,41, and can be lowered by pulling downwards the handles 50,51, can be raised under the action of the pressure of the air exerted on the sail ends.

The suspending ropes 40,41 are also fixed to the respective ends of braking levers 32,34. A braking cable 56 passes into the interior of the right-hands tubular post 27 and is connected to the braking lever 32 at an anchoring point 52 close to the end 30 of crossbeam 7. The other end of the braking cable 56 is connected to a braking control pedal 54 located in the lower part of the arch-like structure. A not shown, but identical braking cable passes in to the left-hand post 25. It is clear that the sail ends can be raised or lowered by action on handles 50,51 or pedals 54, 55, as a requirement of the piloting needs.

As be seen in FIG. 6, the padal 54 to which is fixed the braking cable 56 is fixed to a return spring 60. The propeller 8 is mounted at the rear of the motorcycle and is streamlined, the width of its fairing not exceeding the width of the motorcycle, which makes it possible to use the latter on the road without having to dismantle the propeller. If it is wished to use a larger propeller, a folding blade type will be used, in the manner shown in FIG. 5, where a dismantlable or folding fairing is used.

The propeller rotation shaft 61 is mounted beneath the motorcycle seat between two parallel,lateral crossbeam 63, 65 forming an integral part of the arch-like structure. The connections between the propeller 8 and the engine 10 are by means of a mechanism 64 of the manually controlled disengageable hub type making it possible to disengage the gear box output gear wheel and engage the transmission of the motorcycle engine to the propeller 8 via a chain 67 or serrated belt of a 90° bevel gear lever 68. A steering shock absorber keeps the front wheel in the longitudinal axis of the motorcycle during flight. A return-free gas control mounted on the motorcycle handlebars makes it possible to keep the gases under constant conditions during flight.

Obviously the embodiment as described hereinbefore have only been given given for illustration purposes and numerous modifications and variants are possible thereto without passing beyond the scope of the invention.

I claim:

1. Device making it possible to transform a motorcycle in to a powered ultralight aircraft, said device comprising an arch-like structure (3) with a shape similar to a cage and which can be fixed to the motorcycle (1), essentially to its frame and sides; a parafoil sail (5) which can be installed at the top of the cage, it being possible to lower the sail ends by a handle control (50,51) or pedal control (54,55); a propeller propulsion system (8) mounted at the rear of the motorcycle on the arch-like structure; and a clutching and declutching mechanism which, on control, drives either the driving wheel or the propeller.

2. Device according to claim 1, wherein the arch-like structure (3) has at its top a crossbeam (7) separating two posts of the structure (25,27) on which are fixed the four suspending ropes (20,21,22,23) from the parapenting sail (5).

3. Device according to claim 1, further comprising two supplementary suspending ropes (40,41) which connect the sail ends to the free ends (43,44) of the two braking levers, said braking levers being articulated to the crossbeam (7) and maintained in the horizontal position by return springs (36,37), said braking levers being lowered by the action of two cables (56), each connected to a pedal (54,55).

4. Device according to claim 3, wherein said supplementary suspending ropes (40,41) associated with the sail ends are connected to handle cables (50,51), which can be displaced in passages in the crossbeam (7), so as to permit the raising or lowering of the sail ends.

5. Device according to claim 1, wherein a shaft (61) of the propeller (8) is equipped at its free end with a bevel gear forming a lever (68) cooperating with a bevel gear driven by chain or a serrated belt driveable at random by the drive shaft.

* * * * *